United States Patent [19]

Lafreniere

[11] Patent Number: 5,863,884
[45] Date of Patent: Jan. 26, 1999

[54] SILICONE AND ADHESIVE REMOVAL COMPOSITION

[76] Inventor: Donald R. T. Lafreniere, P.O. Box 1152, Tallevast, Fla. 34270

[21] Appl. No.: 872,850

[22] Filed: Jun. 11, 1997

[51] Int. Cl.⁶ .................................. C11D 1/78; C11D 3/44

[52] U.S. Cl. ...................... 510/412; 510/424; 510/475; 510/495; 510/505

[58] Field of Search .................................. 134/40, 42, 38, 134/311; 510/134, 174, 175, 176, 188, 271, 412, 413

[56] References Cited

U.S. PATENT DOCUMENTS 4,410,367  10/1983  LeGrand .................................. 106/308
5,409,736   4/1995  Leiner et al. .......................... 427/372.2

*Primary Examiner*—Paul Lieberman
*Assistant Examiner*—Gregory E. Webb
*Attorney, Agent, or Firm*—Charles J. Prescott

[57] ABSTRACT

A composition as a strong surfactant such as a fluorosurfactant for breaking down the adhesive bond and removing cured silicone and other adhesives. The fluorosurfactant demonstrates improved effectiveness and rate of removal of these adhesives over all other known products currently available.

13 Claims, No Drawings

SILICONE AND ADHESIVE REMOVAL COMPOSITION

BACKGROUND OF THE INVENTION

1. Scope of Invention

This invention relates generally to strong surfactants such as fluorosurfactants, and more particularly to such a composition which effectively and quickly breaks down the bond and removes cured silicone and other adhesives.

2. Prior Art

The present invention deals with the cleaning of surfaces which have been contaminated with silicone rubber, polyurethane adhesives and the like. Silicone rubbers, polymers and elastomers are chemically inert when cured and thus find wide application as a sealing and caulking agent for windows, tiles, bathtubs, stonewares, bricks and in the boat and automotive industries.

As a result of on-site usage, spills, smears and unwanted contamination of the surrounding surfaces such as glass, fiberglass, fabric, moldings, bricks, tiles and related surfaces, are likely to occur. The removal of such surplus, unsightly adhesive is normally accomplished by physical means, involving scrapers and abrasives which, at best, is slow and laborious.

Commercially available products such as the Amtex CCR silicone dissolver, although claiming to solubilize cured resins in a time period of one to eight hours at room temperature, is typically ineffective for this purpose based upon evaluation by applicant. In general, efforts to utilize this product to remove cured silicone stain have met with very limited success, if not unsuccessful altogether. Moreover, the Amtex CCR cleaner, as well as other marketed products, contain a solvent base of volatile liquid hydrocarbons which is environmentally undesirable.

The present invention is a result of development effort for a cleaner which would easily remove cured silicone rubbers, polymers, and elastomeric resins which would be efficient, fast and usable with a solvent which is ozone friendly and which is environmentally compatible. One embodiment also has a water soluble non-flammable solvent.

BRIEF SUMMARY OF THE INVENTION

This invention is directed to a composition as a solution containing a strong surfactant such as a fluorosurfactant for breaking down the adhesive bond and removing cured silicone and other adhesives. The solution containing the fluorosurfactant demonstrates improved effectiveness and rapid rate of removal of these adhesives over all other known products currently available and moreover is environmentally compatible.

It is therefore an object of this invention to provide a solution containing a strong surfactant such as a fluorosurfactant which will quickly and effectively dissolve and remove cured silicone rubber.

It is yet another object of this invention to provide a composition which will effectively remove cured silicone, rubber, polymers and elastomers which were cured as excess onto surfaces such as windows, tiles, bathtubs, stonewares, bricks, boat and automotive related product.

It is still another object of this invention to provide a strong surfactant such as a fluorosurfactant for the removal of cured silicone rubber and other inert adhesives which contains an environmentally compatible solvent.

It is still another object of this invention to provide a composition for the quick and easy removal of cured silicones and the like which will effect removal in substantially less time than that of currently available marketed products.

Another object of this invention to provide a fluorosurfactant for the quick and easy removal of cured silicone and other adhesives which utilizes an ozone friendly solvent presently available from commercial chemical suppliers.

In accordance with these and other objects which will become apparent hereinafter, the instant invention will now be described.

DETAILED DESCRIPTION OF THE INVENTION

The present invention in its various embodiments is directed to a chemical compound for the easy and quick removal of cured silicone rubber, polyurethane adhesives and other polymers and elastomers which are chemically inert when cured. Typically, these adhesives are applied to windows, tiles, bathtubs, stonewares, bricks and in the boat and automotive industries and, in many cases, in an on-site or field situation. As a result, excess adhesive material which is not immediately removed with an appropriate solvent, once cured, becomes extremely difficult to physically remove by rubbing or abrading techniques.

The major active components of the present invention are fluorochemical surfactants such as those manufactured by the 3M Corporation, product designation Fluorad FC-740, FC-730 and FC-431, FC-740 being preferred. These fluorosurfactants are combined with octylphenoxy-ethanol surfactants such as commercially available Triton X-15 and X-100 or T-Det-09.

Several examples of the various embodiments of the invention are described herebelow, all of which have been shown in practical application to be effective and rapid in removal of cured adhesives.

EXAMPLE I

Shown in Table I herebelow is the preferred embodiment of the invention under applicant's trade designation DSR-5, wherein the commercial designation for each of the components is there shown, followed by the percentage of each component as a percentage by volume.

TABLE I

| DSR-5 (Preferred) | |
| --- | --- |
| Product Component | % by Volume |
| KWIK DRI | 96.04% |
| FC-740 | 0.99% |
| X-15 | 0.99% |
| Ninate 411 | 0.99% |
| D-Limonene | 0.99% |
| Total | 100.00% |

Ninate 411 is commercially available from Stepan Company having a generic description as amine alkylbenzene sulfonate. In this preferred embodiment, the KWIK DRI is an aliphatic hydrocarbon solvent available from Ashland Chemical Co. The D-Limonene, available from a number of sources' is non essential and added for fragrance. This embodiment has been shown to be effective in removing cured stains of silicone rubber caulking from glass surfaces after 45 seconds of contact and mild agitation with a plastic scraper.

EXAMPLE II

Based upon the above preferred compound of ingredients, Table II shown herebelow reflects the effective useful range of each of these ingredients or components as a percentage of total volume. In essence, each of the components listed may appear in an effective formula of ingredients up to in the range of about 20% by volume.

TABLE II

Range of Ingredients

| Component | Range |
| --- | --- |
| KWIK DRI | 20–96% |
| FC-740 | 0.5–20% |
| X-15 | 0.5–20% |
| Ninate 411 | 0.5–20% |
| D-Limonene | 0.5-20% |

EXAMPLE III

Table III shown herebelow is a breakdown of the preferred embodiment of the invention shown in Table I hereinabove in which the generic ingredients of each of the commercially available products are shown. The heavy aromatic solvent and the naphthalene present in FC-740 are not considered essential to this invention.

TABLE III

Generic Makeup of Preferred Embodiment of Table I

| Commercial Ingredient | % By Volume | Components Breakdown | % By Volume |
| --- | --- | --- | --- |
| KWIK DRI | 96.04% | Aliphatic Hydrocarbon | 96.0400% |
| FC-740 | 0.99% | Heavy Aromatic Solvent; Naphtha | 0.4455% |
| | | Fluoroaliphatic Polymeric Ester | 0.4950% |
| | | Naphthalene | 0.0495% |
| X-15 | 0.99% | Octylphenoxypolyethoxy-ethanol | 0.9603% |
| | | Polyethylene Glycol | 0.0297% |
| Ninate 411 | 0.99% | Amine Alkylbenzene Sulfonate | 0.99% |
| D-Limonene | 0.99% | Aliphatic Hydrocarbon | 0.99% |
| Total | 100% | | 100% |

EXAMPLE IV

As a substitute for the aliphatic hydrocarbon as a solvent in the above preferred embodiment, an alternate solvent commercially available as SOYGOLD, a soybean oil methyl ester solvent, available from Ag Environmental Products, is shown in Table IV herebelow.

TABLE IV

Alternate Solvent Used

| Commercial Ingredient | % By Volume | Components Breakdown | % By Volume |
| --- | --- | --- | --- |
| SOYGOLD | 96.04% | Soybean Oil Methyl Ester | 96.0400% |
| FC-740 | 0.99% | Heavy Aromatic Solvent Naphtha | 0.4455% |
| | | Fluoroaliphatic Polymeric Ester | 0.4950% |
| | | Naphthalene | 0.0495% |
| X-15 | 0.99% | Octylphenoxypolyethoxy-ethanol | 0.9603% |
| | | Polyethylene Glycol | 0.0297% |
| Ninate 411 | 0.99% | Amine Alkylbenzene Sulfonate | 0.99% |
| D-Limonene | 0.99% | Aliphatic Hydrocarbon | 0.99% |
| Total | 100% | | 100% |

This embodiment provides a non-flammable water soluble form of surfactant by the utilization of the SOYGOLD solvent.

EXAMPLE V

Referring now to Table V herebelow, yet another embodiment of the invention having an ozone friendly solvent base under the commercial designation Methyl Siloxanne or generically, decamethyltetrasiloxane, is shown.

TABLE V

Ozone Friendly Solvent Used

| Commercial Ingredient | % By Volume | Components Breakdown | % By Volume |
| --- | --- | --- | --- |
| Methyl Siloxanne | 96.04% | Decamethyltetrasiloxane | 96.0200% |
| FC-740 | 0.99% | Heavy Aromatic Solvent Naphtha | 0.4455% |
| | | Fluoroaliphatic Polymeric Ester | 0.4950% |
| | | Naphthalene | 0.0495% |
| X-15 | 0.99% | Octylphenoxypolyethoxy-ethanol | 0.9603% |
| | | Polyethylene Glycol | 0.0297% |
| Ninate 411 | 0.99% | Amine Alkylbenzene Sulfonate | 1.0000% |
| D-Limonene | 0.99% | Aliphatic Hydrocarbon | 1.0000% |
| Total | 100% | | 100% |

This solvent shown in the example in Table V, available from Dow Corning is well known to be substantially inert with respect to damage to ozone and therefore provides an environmentally desirable alternative embodiment of this invention.

OTHER EXAMPLES

A number of other examples have been developed and evaluated and are shown to be very effective at cured adhesive removal. One such example includes a 1% by volume amount of FC-740 from 3M in a hydrocarbon solvent combined with a 1% by volume of Triton X-15. This solution was shown to be effective in removing a stain of cured Dow Corning Silicone Rubber Caulking from a glass surface after less than one minute of contact with mild agitation with a plastic scraper.

Another example which was evaluated included 1% by volume of FC-740, 1% of T-DET-09, available from Harcros Chemicals, Inc. in a soybean oil methyl ester solvent. This solution was shown to clean wood surfaces stained with General Electric's RTV Rubber Cement after one minute of contact and mild agitation, after which the surface was rinsed clean with water.

Yet a further example of the invention included a solution having 1% FC-740, 1% FC431, both from 3M, and 1% Triton X-100 from the Union Carbide Corporation, dissolved in Dow Corning OS-30 Solvent. This solvent is commercially described as ozone-safe volatile methylsiloxane (VMS) fluids developed specifically for use as precision cleaning agents and carriers, the solution shown to be effective in removing 3M Super 77 Spray Adhesive from a vinyl vertical area after 15 seconds of saturation.

A further example of an effective solution within the scope of the present invention included 1% FC-740 and a hydrocarbon solvent with 1% Triton X-15. This solution was effective in removing cured SIKAFLEX polyurethane sealant from a vertical section of aluminum after only 60 seconds of soaking and mild agitation there following.

A final additional example of the present invention included 4% FC-740 in a hydrocarbon solvent with 2% Triton X-15. This solution was shown to be effective in removing cured 3M silicone rubber caulking compound from a fabric surface by spraying the stained area with the solution and using a fine to medium bristle brush for agitation.

Fragrances in the form of D-Limonene and amyl acetate were added to make the application of each of the embodiments more appealing. It should be noted that the cleaner also affords the ability for fast and efficient removal of cured adhesives on vertical services, a feature now not presently addressed by any known marketed product.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A silicone and adhesive removal composition comprising:
    A. a base solvent;
    B. fluoroaliphatic polymeric ester;
    C. octylphenoxypolyethoxy-ethanol;
    D. polyethylene glycol;
    E. amine alkylbenzene sulfonate.

2. A silicone and adhesive removal composition as set forth in claim 1, wherein:
    said fluoroaliphatic polymeric ester is present at about 0.5% by volume;
    said octylphenoxypolyethoxy-ethanol is present at about 1.0% by volume;
    said polyethylene glycol is present at about 0.03% by volume;
    said amine alkylbenzene sulfonate is present at about 1.0% by volume.

3. A silicone and adhesive removal composition as set forth in claim 2, wherein:
    said fluoroaliphatic polymeric ester has a presence in the range of about 0.5% to 20% by volume;
    said octylphenoxypolyethoxythanol and said polyethylene glycol have a combined presence in the range of about 0.5% to 20% by volume;
    said amine alkylbenzene sulfonate is present in the range of about 0.05% to 20% by volume;
    said base solvent being aliphatic hydrocarbon and being present in the range of about 20% to 96% by volume.

4. A silicone and adhesive removal composition as set forth in claim 2, wherein:
    said fluoroaliphatic polymeric ester has a presence in the range of about 0.5% to 20% by volume;
    said octylphenoxypolyethoxyethanol and said polyethylene glycol have a combined presence in the range of about 0.5% to 20% by volume; said amine alkylbenzene sulfonate is present in the range of about 0.05% to 20% by volume;
    said base solvent being soybean oil methyl ester and being present in the range of about 20% to 96% by volume.

5. A silicone and adhesive removal composition as set forth in claim 2, wherein:
    said fluoroaliphatic polymeric ester has a presence in the range of about 0.5% to 20% by volume;
    said octylphenoxypolyethoxyethanol and said polyethylene glycol have a combined presence in the range of about 0.5% to 20% by volume;
    said amine alkylbenzene sulfonate is present in the range of about 0.05% to 20% by volume;
    said base solvent being decamethyltetrasiloxane and being present in the range of about 20% to 96% by volume.

6. A cleaning composition comprising:
    A. fluoroaliphatic polymeric ester;
    B. octylphenoxypolyethoxy-ethanol;
    C. polyethylene glycol;
    D. amine alkylbenzene sulfonate;
    E. a suitable solvent constituting me balance of said fluorosurfactant.

7. A fluorosurfactant as set forth in claim 6, wherein:
    said fluoroaliphatic polymeric ester is present in the range of up to about 1% by volume;
    said octylphenoxypolyethoxyethanol is present in the range of up to about 1% by volume;
    said polyethylene glycol is present in the range of up to about 0.1% by volume;
    said amine alkylbenzene sulfonate is present in the range of up to about 10% by volume;
    said solvent is aliphatic hydrocarbon.

8. A fluorosurfactant as set forth in claim 6, wherein:
    said fluoroaliphatic polymeric ester is present in the range of up to about 1% by volume;
    said octylphenoxypolyelhoxyethanol is present in the range of up to about 1% by volume;
    said polyethylene glycol is present in the range of up to about 0.1% by volume;
    said amine alkylbenzene sulfonate is present in the range of up to about 1% by volume;
    said solvent is soybean oil methyl esters.

9. A fluorosurfactant as set forth in claim 6, wherein:
    said fluoroaliphatic polymeric ester is present in the range of up to about 1% by volume;
    said octylphenoxypolyethoxy-ethanol is present in the range of up to about 1% by volume;
    said polyethylene glycol is present in the range of up to about 0.1% by volume;
    said amine alkylbenzene sulfonate is present in the range of up to about 1% by volume;
    said solvent is decamethyltetrasiloxane.

10. A silicone and adhesive removal composition comprising:
    A. fluoroaliphatic polymeric ester;
    B. octylphenoxypolyethoxy-ethanol;
    C. polyethylene glycol;
    D. a solvent taken from the group consisting of aliphatic hydrocarbon, soybean oil methyl ester, and decamethyltetrasiloxane.

11. A silicone and adhesive removal composition comprising:
    A. fluoroaliphatic polymeric ester;

B. octylphenoxypolyethoxy-ethanol;

C. polyethylene glycol;

D. a solvent taken from the group consisting of aliphatic hydrocarbon, soybean oil methyl ester, and decamethyltetrasiloxane.

12. A solvent system comprising:

A. fluoroaliphatic polymeric ester;

B. a solvent taken from the group consisting of soybean oil methyl ester, and decamethyltetrasiloxane.

13. A silicone and adhesive removal composition comprising:

A. fluoroaliphatic polymeric ester,

B. amine alkylbenzene sulfonate;

C. a solvent taken from the group consisting of aliphatic hydrocarbon, soybean oil methyl ester, and decamethyltetrasiloxane.

* * * * *

UNITED STATES PATENT AND TRADEMARK OFFICE
CERTIFICATE OF CORRECTION

PATENT NO. : 5863884
DATED : Jan. 26, 1999
INVENTOR(S) : Donald R.T. Lafreniere

It is certified that error appears in the above-indentified patent and that said Letters Patent is hereby corrected as shown below:

Column 5, line 39, replace "octylphenoxypolyethoxythanol" with -- octylphenoxypolyethoxy-ethanol --.

Column 5, line 50, replace "octylphenoxypolyethoxyethanol" with -- octylphenoxypolyethoxy-ethanol --.

Column 6, line 1, replace "octylphenoxypolyethoxyethanol" with -- octylphenoxypolyethoxy-ethanol --.

Column 6, line 14, replace "me" with -- the --.

Column 6, line 19, replace "octylphenoxypolyethoxyethanol" with -- octylphenoxypolyethoxy-ethanol --.

Column 6, line 29, replace "octylphenoxypolyelhoxyethanol" with -- octylphenoxypolyethoxy-ethanol --.

Signed and Sealed this

Thirteenth Day of July, 1999

Attest:

*Attesting Officer*

Q. TODD DICKINSON

*Acting Commissioner of Patents and Trademarks*